US010924690B2

(12) United States Patent
Duffie (10) Patent No.: US 10,924,690 B2
(45) Date of Patent: Feb. 16, 2021

(54) ELECTRONICALLY CONTROLLING OPTICAL TRANSMISSION OF A LENS OF A CAMERA IN VARIABLE LIGHTING

(71) Applicant: Google LLC, Mountain View, CA (US)

(72) Inventor: Colin Duffie, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/386,326

(22) Filed: Apr. 17, 2019

(65) Prior Publication Data
US 2020/0336642 A1 Oct. 22, 2020

(51) Int. Cl.
*H04N 5/238* (2006.01)
*H04N 5/225* (2006.01)
*H04N 5/232* (2006.01)

(52) U.S. Cl.
CPC .......... *H04N 5/238* (2013.01); *H04N 5/2254* (2013.01); *H04N 5/23209* (2013.01)

(58) Field of Classification Search
CPC ... H04N 5/238; H04N 5/23209; H04N 5/2254
See application file for complete search history.

(56) References Cited

U.S. PATENT DOCUMENTS

| 7,474,453 | B2 | 1/2009 | Shinohara et al. | |
|---|---|---|---|---|
| 9,874,721 | B2 | 1/2018 | Mercado | |
| 10,180,615 | B2 | 1/2019 | Kilgore et al. | |
| 2007/0133983 | A1* | 6/2007 | Traff | H04N 5/235 396/506 |
| 2008/0080850 | A1* | 4/2008 | Amirzadeh | G03B 15/03 396/155 |
| 2008/0304819 | A1* | 12/2008 | Tolbert | H04N 5/2254 396/448 |
| 2011/0280450 | A1* | 11/2011 | Nepomniachtchi | G06K 9/036 382/112 |
| 2014/0063049 | A1* | 3/2014 | Armstrong-Muntner | G03B 9/00 345/619 |
| 2014/0300805 | A1* | 10/2014 | Davis | H04N 5/238 348/362 |
| 2016/0014330 | A1* | 1/2016 | Deng | H04N 5/23216 348/333.01 |
| 2016/0231533 | A1 | 8/2016 | Mercado | |
| 2017/0064179 | A1* | 3/2017 | Richards | H04N 5/2355 |
| 2017/0123575 | A1* | 5/2017 | Evans | H04N 5/2254 |
| 2017/0244938 | A1* | 8/2017 | Al Mohizea | H04N 5/23222 |
| 2018/0341162 | A1 | 11/2018 | Naito | |

FOREIGN PATENT DOCUMENTS

CN 109274789 1/2019

OTHER PUBLICATIONS

PCT International Written Opinion and Search Report in International Application No. PCT/US2019/061450, dated Mar. 12, 2020, 13 pages.

* cited by examiner

*Primary Examiner* — Jason A Flohre
(74) *Attorney, Agent, or Firm* — Fish & Richardson P.C.

(57) ABSTRACT

Methods, systems, and apparatus, for controlling optical transmission of a lens of a camera. A method includes obtaining a first image from a camera, determining that the first image does not satisfy an image requirement, in response to determining that the first image does not satisfy an image requirement, increasing an optical transmission of a lens of the camera, and, obtaining a second image with the camera while the optical transmission of the lens of the camera is increased.

20 Claims, 6 Drawing Sheets

ELECTRONICALLY CONTROLLING OPTICAL TRANSMISSION OF A LENS OF A CAMERA IN VARIABLE LIGHTING

BACKGROUND

Electronic devices may include cameras that can capture images. For example, smart phones include cameras that can be used to take photos.

SUMMARY

This document describes techniques, methods, systems, and other mechanisms that control optical transmission of a lens of a camera. The optical transmission of the lens of the camera may be controlled by adjusting the degree of tint of an outer lens of the camera. For example, the optical transmission of the lens may be decreased in order to darken the tint, or increased in order to lighten the tint.

Darkening the tint of the outer lens of the camera may mask the camera from view of people, or vice versa. For example, the lens of the camera may have a lower visual contrast, e.g. lower perceptual color difference, ΔE as defined by the Commission on Illumination (CIE), when the tint is darker, so that the camera appears to be part of an outer casing of a device.

Similarly, lightening the tint of the outer lens of the camera may de-mask the camera from view of people. For example, the lens of the camera may have a higher visual contrast (e.g. higher perceptual color difference, ΔE as defined by CIE) when the tint is lighter so that the camera appears to be more distinct from an outer casing of a device. Generally, advantages to changing the degree of visual contrast of the camera may include allowing for variable aesthetic design, making people more comfortable with having the device around them, improving image sensor performance relative to a static constant tint, or alerting people to an active sensor state.

A system may control the optical transmission of the lens based on requirements of applications that use images captured by the camera. For example, a mobile computing device may determine not to increase optical transmission when images are to be used for a real-time augmented reality application that does not need images that include a high amount of detail. In another example, the mobile computing device may increase optical transmission when images are to be used for an image capture application that does need high quality images.

Accordingly, control of the optical transmission of the lens of the camera may enable the system to ensure that images captured by the camera are of sufficient quality for applications executing on the system while changing the user-visible appearance as desired.

One innovative aspect of the subject matter described in this specification is embodied in methods that include the actions of obtaining a first image from a camera, determining that the first image does not satisfy an image requirement, in response to determining that the first image does not satisfy an image requirement, increasing an optical transmission of a lens of the camera, and obtaining a second image with the camera while the optical transmission of the lens of the camera is increased.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. For instance, in certain aspects increasing an optical transmission of the lens includes decreasing a tint of the lens. In some aspects, decreasing a tint of the lens includes applying a voltage to a coating on the lens, where the voltage causes the coating on the lens to lighten the tint. In some implementations, determining that the first image does not satisfy an image requirement includes obtaining the image requirement from an application and determining that the image does not satisfy the image requirement obtained from the application.

In certain aspects, obtaining the image requirement from an application includes identifying the application and selecting the image requirements that are associated with the application that was identified from among image requirements stored for multiple different applications. In some aspects, obtaining the image requirement from an application includes providing the first image to an application and obtaining an indication from the application that a quality of the first image is insufficient. In some implementations, actions include obtaining an indication of an amount of ambient light from an ambient light sensor and increasing the optical transmission of the lens of the camera based on the amount of ambient light before obtaining the first image. In certain aspects, actions include after obtaining the second image, determining that the second image satisfies the image requirement and in response to determining that the second image satisfies the image requirement, decreasing the optical transmission of the lens of the camera.

In some aspects, actions include determining a current optical transmission of the lens of the camera before obtaining a third image, obtaining a second image requirement for the third image, and determining to increase the optical transmission of the lens of the camera before obtaining the third image based on the second image requirement and the current optical transmission of the lens. In some implementations, actions include determining that a user is interacting with a particular application and in response to determining that the user is interacting with the particular application, obtaining a particular image requirement for the particular application as the image requirement.

Details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
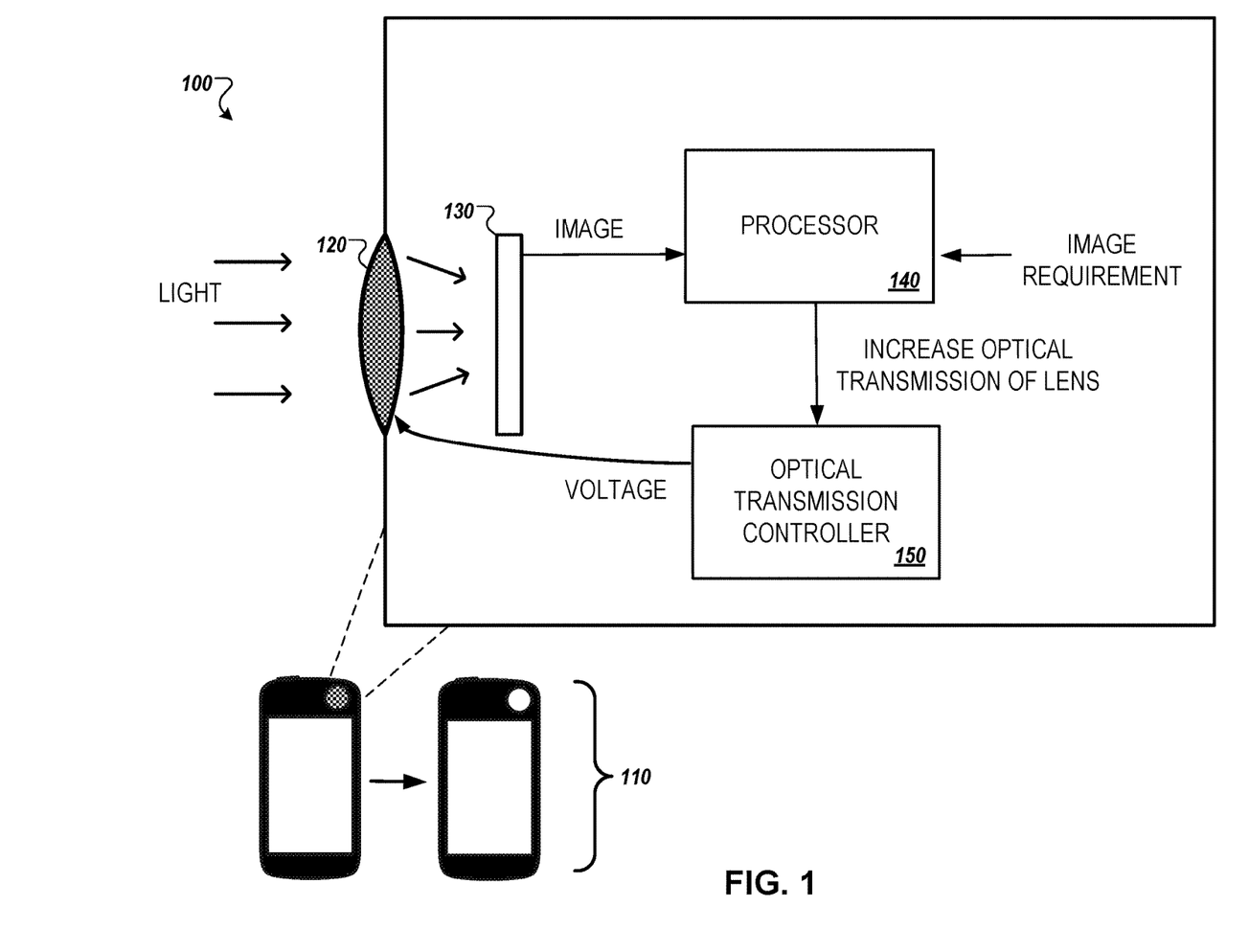
FIG. 1 is a block diagram of an example system that controls optical transmission of a lens of a camera.

FIG. 1 is a block diagram of an example system 100 that controls optical transmission of a lens of a camera. The system 100 includes a mobile computing device 110 with a lens 120, a sensor 130, a processor 140, and an optical transmission controller 150. FIG. 1 illustrates how the optical transmission of the lens 120 may be controlled so that the lens 120 initially has a low optical transmission with a dark tint so the lens 120 is more masked from view of people, and then when being used to capture high quality images, the lens 120 has a high optical transmission with a light tint so the lens 120 is less masked from view of people.

The lens 120 may be made of glass or some other material through which light can transmit and be coated with a substance through which the optical transmission of the lens 120 may be controlled. For example, the lens 120 may be coated with a film of material that is dark with low optical transmission when no voltage is applied to the film and that is light with high optical transmission when a voltage is applied to the film.

In another example, the lens 120 may be coated with a film of material that is dark with low optical transmission when voltage is applied to the film and that is light with high optical transmission when no voltage is applied to the film. In yet another example, the lens 120 may be coated with a film of material that is dark with low optical transmission after a first voltage is applied to the film and that is light with high optical transmission after a second, different voltage is applied to the film.

The sensor 130 senses light directed to the sensor 130 by the lens 120 and generates an image based on the light sensed by the sensor 130. For example, the sensor 130 may be an array of photodiodes that are covered by a color filter array. As the light passes through the lens 120 to reach the sensor 130, increasing optical transmission of the lens 120 results in more light being sensed by the sensor 130. In many cases, the more light that is sensed by the sensor 130, the more details that the sensor 130 is able to sense and represent in images generated from the sensor 130.

The processor 140 receives an image from the sensor 130 and an image requirement, and provides instructions to the optical transmission controller 150 based on the image and the image requirement. For example, the processor 140 may receive an image generated when the lens 120 has a low optical transmission and an image requirement that indicates that a high quality image is needed by an application and, in response, provide, to the optical transmission controller 150, an instruction to increase the optical transmission of the lens 120.

In another example, the processor 140 may receive an image generated when the lens 120 has a low optical transmission and an image requirement that indicates that a low quality image is needed by an application and, in response, determine not to change the optical transmission of the lens 120 so the processor 140 will not instruct the optical transmission controller 150 to adjust the optical transmission of the lens 120.

The processor 140 may receive the image requirement from an application that is currently requesting an image. For example, the processor 140 may receive a request from an application that indicates "Request video stream at high quality" where "high quality" indicates that high quality images are needed.

In another example, the processor 140 may receive a request from an application that indicates "Request video stream at low quality" where "low quality" indicates that low quality images are needed. In yet another example, the processor 140 may receive a request from an application that indicates "Request video stream for augmented reality application X," where in response to the request, the processor 140 accesses previously stored information that indicates augmented reality application X needs images of high quality.

Additionally or alternatively, the processor 140 may provide the image received by the processor 140 to an application that is requesting the image, and the application may then respond with an indication whether the image is satisfactory or is not satisfactory. For example, the processor 140 may provide the image to augmented reality application X and receive a response of "higher quality needed" or "insufficient quality" and, in response, increase optical transmission of the lens 120.

The processor 140 may determine to decrease optical transmission of the lens 120 based on determining that no applications are requesting images. For example, the processor 140 may determine that no application has requested an image within the last one second, five second, ten seconds, or some other amount of time and, in response, decrease the optical transmission. In another example, the processor 140 may determine that the application that requested the image has provided an indication that no more images are needed, in response, determine whether any other application needs images, and, in response to determining that no other application needs images, determine to decrease the optical transmission.

The processor 140 may determine an amount to decrease optical transmission based on ambient light conditions determined from an image from the sensor 130. For example, for an image that has a high average brightness that indicates high ambient light, the processor 140 may decrease the optical transmission more, and for low ambient light, the processor 140 may decrease the optical transmission less.

Based on the determination of the processor 140 whether to increase or decrease optical transmission, the processor 140 may provide a corresponding instruction to the optical transmission controller 150. For example, in response to determining to increase optical transmission, the processor 140 may provide the optical transmission controller 150 an instruction of "increase optical transmission."

In another example, in response to determining to decrease optical transmission, the processor 140 may provide the optical transmission controller 150 an instruction of "decrease optical transmission." In some implementations, in response to determining to maintain optical transmission, the processor 140 may not provide the optical transmission controller 150 any instructions.

The optical transmission controller 150 may receive the instruction from the processor 140 and control application of a voltage to the lens 120 based on the instructions. For example, as shown in FIG. 1, the lens 120 may be covered by a film that increases in optical transmission when a voltage is applied so that when the optical transmission controller 150 receives the instruction to increase optical transmission, the optical transmission controller 150 may begin applying voltage to the lens 120. In the example, when the optical transmission controller 150 later receives an instruction to decrease optical transmission, the optical transmission controller 150 may stop applying voltage to the lens 120.

In another example, the lens 120 may be covered by a film that decreases in optical transmission when a voltage is applied so when the optical transmission controller 150 receives the instruction to increase optical transmission, the optical transmission controller 150 may stop applying voltage to the lens 120. In the example, when the optical transmission controller 150 later receives an instruction to decrease optical transmission, the optical transmission controller 150 may begin applying voltage to the lens 120.

In yet another example, the lens 120 may be covered by a film that changes to a first optical transmission when a first voltage is applied, maintains optical transmission when no voltage is applied, and changes to a second, lower optical transmission when a second voltage is applied. In the example, when the optical transmission controller 150 receives the instruction to increase optical transmission, the optical transmission controller 150 may, in response, apply the first voltage to the lens 120. In the example, when the optical transmission controller 150 later receives an instruction to decrease optical transmission, the optical transmission controller 150 may, in response, apply the second voltage to the lens 120.

While the system 100 is described as including the lens 120, the sensor 130, the processor 140, and the optical transmission controller 150, the system 100 may include additional, fewer, or different components. For example, the optical transmission controller 150 may be combined into the processor 140.

Figure 2:
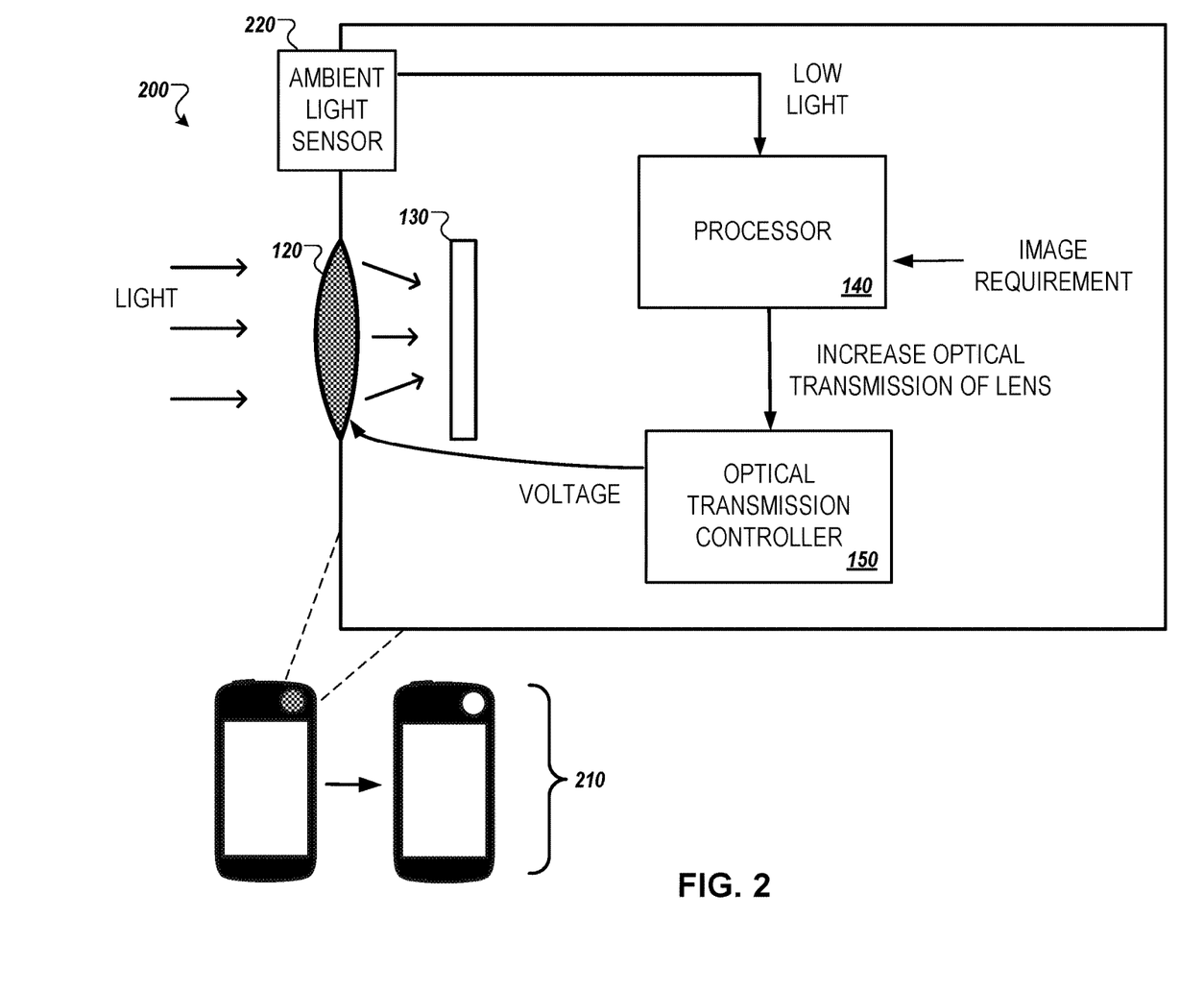
FIG. 2 is a block diagram of an example system that controls optical transmission of a lens of a camera based on sensed ambient light.

FIG. 2 is a block diagram of an example system 200 that controls optical transmission of a lens of a camera based on sensed ambient light. In some implementations, changing the optical transmission of the lens 120 may take time so the processor 140 may change the optical transmission of the lens 120 based on ambient light even before the sensor 130 is used to capture an image. For example, the lens 120 may not lighten in tint until one, two, five, or some other number of seconds after a voltage is applied by the optical transmission controller 150. Changing the optical transmission of the lens 120 based on ambient light may reduce the amount of time needed for the lens 120 to change tint while waiting to capture an image.

The system 200 is similar to the system 100 as it also includes a mobile computing device 210 that includes the lens 120, the sensor 130, the processor 140, and the optical transmission controller 150. However, the mobile computing device 210 also includes an ambient light sensor 220.

The ambient light sensor 220 is a sensor that senses ambient light in an environment and provides an indication of the amount of sensed light to the processor 140. For example, the ambient light sensor 220 may provide a low amount of electrical current to the processor 140 that indicates to the processor 140 that low light is being sensed. In another example, the ambient light sensor 220 may provide a higher amount of electrical current to the processor 140 that indicates to the processor 140 that more light is being sensed. The ambient light sensor 220 may be an unpowered sensor that converts sensed light to electrical current where the greater the amount of sensed light the greater the electrical current.

The processor 140 receives the indication of the amount of sensed light and the image requirements, and determines whether to change optical transmission of the lens 120 based on the indication. For example, the processor 140 may receive an indication of low light from the ambient light sensor 220 and an image requirement of medium quality image and, in response, determine that as the amount of ambient light is low the optical transmission of the lens 120 should be increased so that when the sensor 130 later captures an image, the image may already satisfy the image requirements. In the example, even if the image does not satisfy the image requirements, the optical transmission of the lens 120 may need to be increased less than from a default so the system 200 may not need to wait as long for the optical transmission of the lens 120 to increase in response to voltage applied to the lens 120.

Figure 3A:
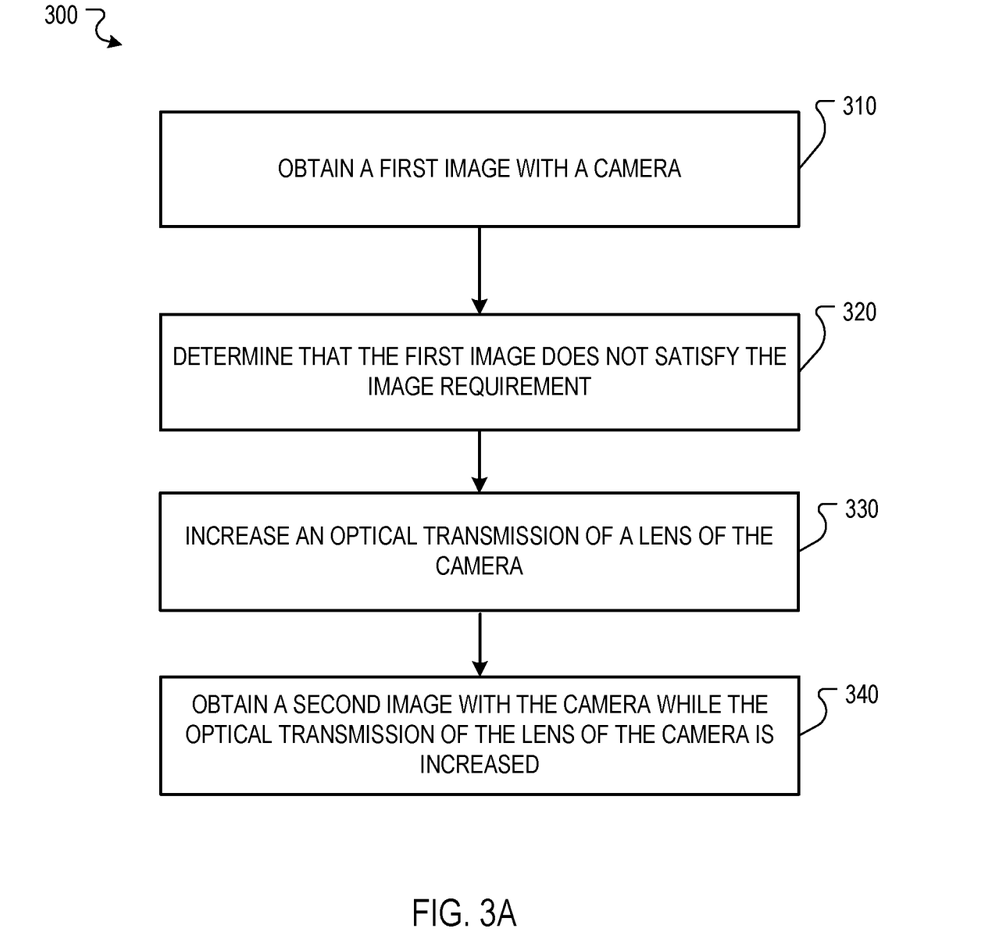
FIG. 3A is a flow diagram that illustrates an example of a process of controlling optical transmission of a lens of a camera.

FIG. 3A is a flow diagram that illustrates an example of a process 300 of controlling optical transmission of a lens of a camera. The process 300 may be performed by one or more computing systems, such as the systems 100 or 200 shown in FIGS. 1 and 2.

The process 300 includes obtaining a first image from a camera (310). For example, the processor 140 may obtain a first image generated from the sensor 130 sensing light that is transmitted through the lens 120.

The process 300 includes determining that the first image does not satisfy an image requirement (320). For example, the processor 140 may determine that an average brightness of the first image is below a minimum required average brightness. In another example, the processor 140 may determine that the amount of details in the first image is insufficient for use by a particular application.

In some implementations, determining that the first image does not satisfy an image requirement includes obtaining the image requirement from an application and determining that the image does not satisfy the image requirement obtained from the application. For example, the processor 140 may receive a request from an augmented reality application executing on the mobile computing device 110 for an image of high quality and determine that a quality of the first image is not of high quality.

In some implementations, obtaining the image requirement from an application includes identifying the application and selecting the image requirements that are associated with the application that was identified from among image requirements stored for multiple different applications. For example, the processor 140 may receive a request from an augmented reality application executing on the mobile computing device 110 for an image, identify the request as coming from the augmented reality application, and access stored image requirements for multiple different applications to identify a particular image requirement labeled as specifying the image requirement for the augmented reality application.

In some implementations, obtaining the image requirement from an application includes providing the first image to an application and obtaining an indication from the application that the quality of the first image is insufficient. For example, the process 300 may provide the first image to the augmented reality application, the augmented reality application may determine that the first image is of too low quality to use, and, in response, the augmented reality application may provide an indication to the processor 140 that the first image is of insufficient quality.

The process 300 includes increasing an optical transmission of a lens of the camera (330). For example, the processor 140 may instruct the optical transmission controller 150 to increase optical transmission of the lens 120. In the example, the optical transmission controller 150 may cause the lens 120 to lighten in tint.

In some implementations, decreasing a tint of the lens includes applying a voltage to a coating on the lens, where the voltage causes the coating on the lens to lighten the tint. For example, the optical transmission controller 150 may apply a voltage to an electrochromic film on the lens.

The process 300 includes obtaining a second image with the camera while the optical transmission of the lens 120 of the camera is increased (340). For example, the processor 140 may obtain the second image after the optical transmission of the lens 120 is increased.

In some implementations, the process 300 includes obtaining an indication of an amount of ambient light from an ambient light sensor and increasing the optical transmission of the lens of the camera based on the amount of ambient light before obtaining the first image. For example, the processor 140 may receive an indication from the ambient light sensor 220 that the ambient light sensed is now low light instead of high light and, in response, determine to increase the optical transmission of the lens 120.

In some implementations, the process 300 includes after obtaining the second image, determining that the second image satisfies the image requirement and, in response to determining that the second image satisfies the image requirement, decreasing the optical transmission of the lens of the camera. For example, the processor 140 may determine that the second image satisfied image requirements of the augmented reality application so that no other images are needed by the augmented reality application and, in response, the processor 140 may instruct the optical transmission controller 150 to increase darkness of the tint of the lens 120.

In some implementations, the process 300 includes determining a current optical transmission of the lens of the camera before obtaining a third image, obtaining a second image requirement for the third image, and determining to increase the optical transmission of the lens of the camera before obtaining the third image based on the second image requirement and the current optical transmission of the lens. For example, the processor 140 may determine that the lens 120 is at a moderate darkness tint, obtain a requirement of high image quality, and, in response, determine to increase the optical transmission of the lens based on determining that a high image quality is likely to need a low darkness tint.

In another example, the processor 140 may determine that the lens 120 is at a low darkness tint, obtain a requirement of low image quality, and, in response, determine to decrease optical transmission of the lens based on determining that a low image quality is likely to be satisfied by a high darkness tint. In yet another example, the processor 140 may determine that the lens 120 is at a medium darkness tint, obtain a requirement of medium image quality, and, in response, determine to maintain optical transmission of the lens based on determining that a medium image quality is likely to be satisfied by a medium darkness tint.

In some implementations, the process 300 includes determining that a user is interacting with a particular application and, in response to determining that the user is interacting with the particular application, obtaining a particular image requirement for the particular application as the image requirement. For example, the processor 140 may determine that a user is interacting with an augmented reality application that uses high quality images and, in response, even before the augmented reality application requests any images, determine high quality as the image requirement. In some implementations, the process 300 includes detecting that an image is likely to be requested and, in response, increasing optical transmission. For example, the processor 140 may determine that a user only holds the mobile computing device 110 in a particular position when taking a photo and, in response, to detecting that the user is holding the mobile computing device 110 in the particular position, increase optical transmission of the lens 120.

Figure 3B:
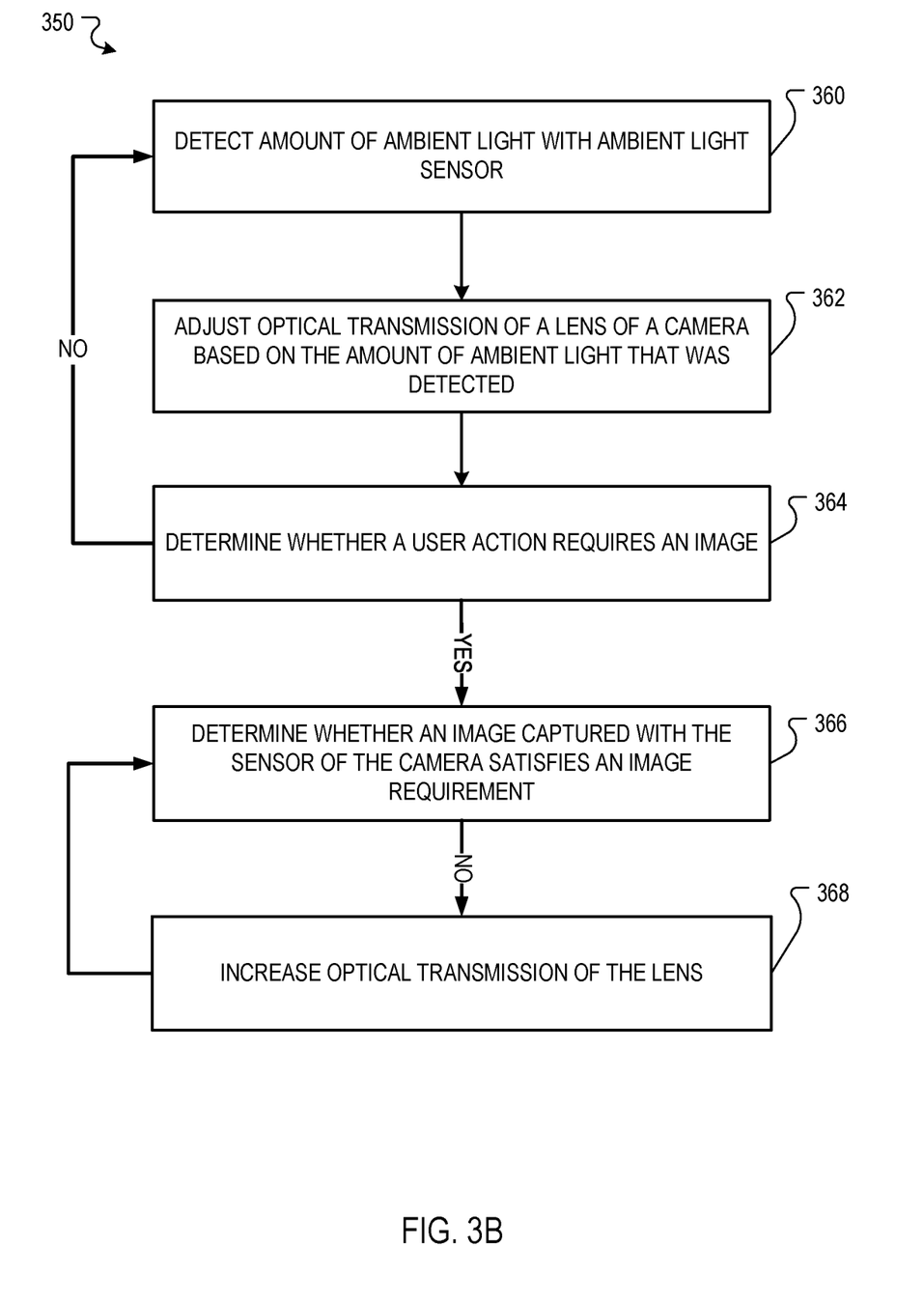
FIG. 3B is a flow diagram that illustrates example of another process of controlling optical transmission of a lens of a camera.

FIG. 3B is a flow diagram that illustrates example of another process 350 of controlling optical transmission of a lens of a camera. The process 350 includes detecting an amount of ambient light with an ambient light sensor (360). For example, before the mobile computing device 110 captures images with the sensor 130, the processor 140 may be receiving data from the ambient light sensor 220 that indicates ambient lighting conditions.

The process 350 includes adjusting optical transmission of a lens of a camera based on the amount of ambient light that was detected (362). For example, the processor 140 may increase optical transmission when ambient light decreases and decrease optical transmission when ambient light increases.

The process 350 includes determining whether a user action requires an image (364). For example, the processor 140 may determine that no image has been requested and, in response, loop back to detecting the amount of ambient light (360). In another example, the processor 140 may determine that an image has been requested and capture an image with the sensor 130.

The process 350 includes determining whether an image captured with a sensor of the camera satisfies an image requirement (366). For example, if the processor 140 determines that an image that was captured with the sensor 130 of the camera satisfies image requirements, the processor 140 may stop adjusting the optical transmission. In another example, if the processor 140 determines that an image that was captured with the sensor 130 of the camera does not satisfy image requirements, the processor 140 may continue with increasing optical transmission of the lens (368), capture an additional image, and loop back to determine whether the additional image satisfies the image requirement (366).

In some implementations, a process includes determining a lighting condition for a camera and changing a tint of a lens of the camera to match an outer case of a device that includes the camera based on the lighting condition. For example, the processor 140 may determine an amount of ambient light based on an image captured by the sensor 130 or amount of light detected by the ambient light sensor 220, determine that the amount of ambient light is greater than a threshold amount of ambient light, and, in response, instruct the optical transmission controller 150 to darken the tint of the lens 120 so that the lens 120 better matches a black color of the outer case of the computing device 210.

Figure 4:
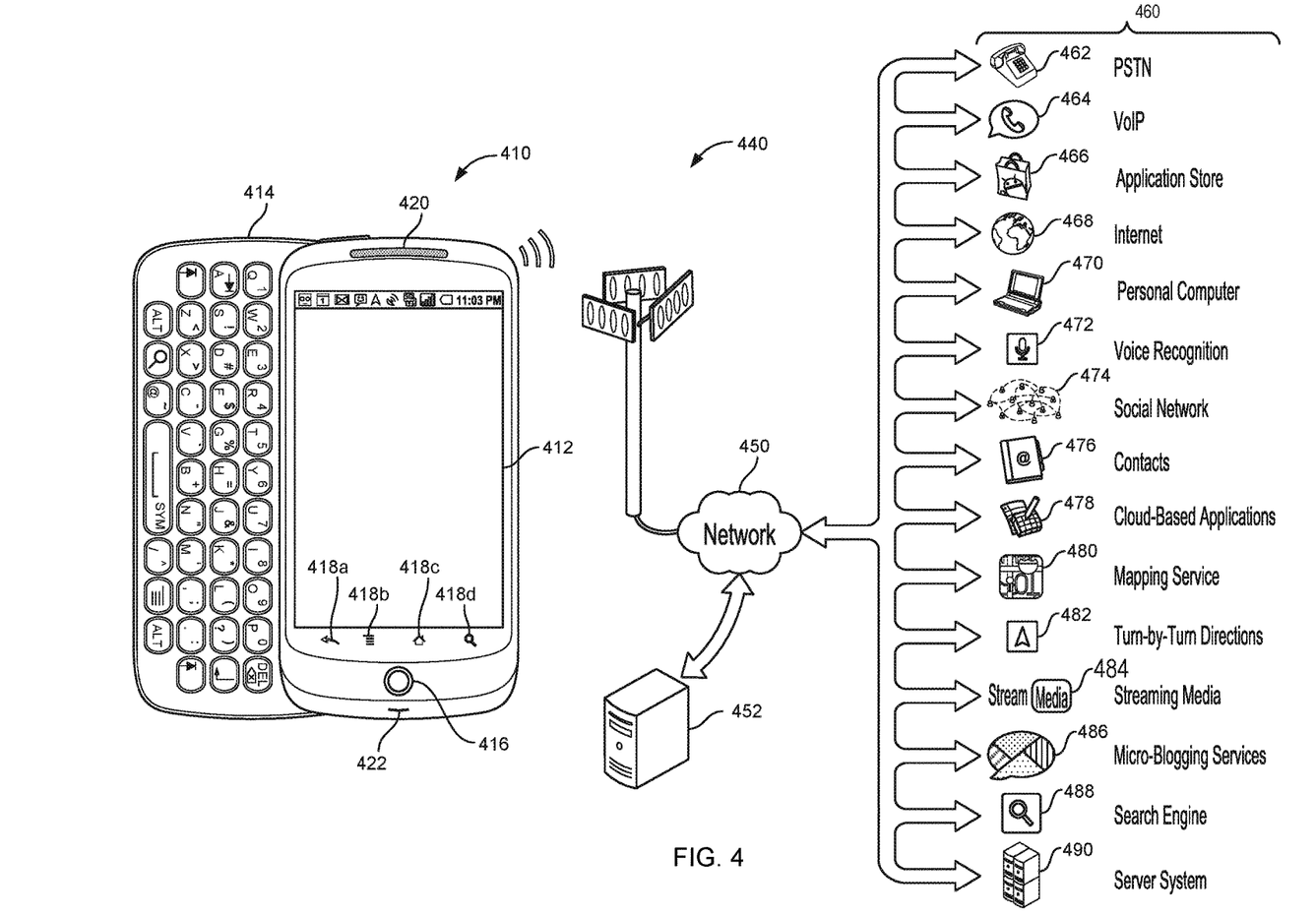
FIG. 4 is a conceptual diagram of a system that may be used to implement the systems and methods described in this document.

Referring now to FIG. 4, a conceptual diagram of a system that may be used to implement the systems and methods described in this document is illustrated. In the system, mobile computing device 410 can wirelessly communicate with base station 440, which can provide the mobile computing device wireless access to numerous hosted services 460 through a network 450.

In this illustration, the mobile computing device 410 is depicted as a handheld mobile telephone (e.g., a smartphone, or application telephone) that includes a touchscreen display device 412 for presenting content to a user of the mobile computing device 410 and receiving touch-based user inputs. Other visual, auditory, and tactile output components may also be provided (e.g., LED lights, a speaker for providing tonal, voice-generated, or recorded output, or vibrating mechanisms for tactile output), as may various different input components (e.g., keyboard 414, physical buttons, trackballs, accelerometers, gyroscopes, and magnetometers).

Example visual output mechanism in the form of display device 412 may take the form of a 3.7 or 4.3 inch LED or AMOLED display with resistive or capacitive touch capabilities, for displaying video, graphics, images, and text, and coordinating user touch inputs locationally with the displayed information so that user contact above a displayed item may be associated with the item by the device 410. The mobile computing device 410 may take alternative forms also, including as a laptop computer, a tablet or slate computer, a personal digital assistant, an embedded system (e.g., a car navigation system), a desktop personal computer, or a computerized workstation.

An example mechanism for receiving user-input includes keyboard 414, which may be a full qwerty keyboard or a traditional keypad that includes keys for the digits '0-9', '*', and '#.' The keyboard 414 receives input when a user physically contacts or depresses a keyboard key. User manipulation of a trackball 416 or interaction with a trackpad enables the user to supply directional and rate of rotation information to the mobile computing device 410 (e.g., to manipulate a position of a cursor on the display device 412).

The mobile computing device 410 may be able to determine a position of physical contact with the touchscreen display device 412 (e.g., a position of contact by a finger or a stylus). Using the touchscreen 412, various "virtual" input mechanisms may be produced, where a user interacts with a graphical user interface element depicted on the touchscreen 412 by contacting the graphical user interface element. An example of a "virtual" input mechanism is a "software keyboard," where a keyboard is displayed on the touchscreen and a user selects keys by pressing a region of the touchscreen 412 that corresponds to each key.

The mobile computing device 410 may include mechanical or touch sensitive buttons 418a-d. Additionally, the mobile computing device may include buttons for adjusting volume output by the one or more speakers 420, and a button for turning the mobile computing device on or off. A microphone 422 allows the mobile computing device 410 to convert audible sounds into an electrical signal that may be digitally encoded and stored in computer-readable memory, or transmitted to another computing device. The mobile computing device 410 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 410 may present a graphical user interface with the touchscreen 412. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 404. User-selection of the button may invoke the pre-defined action.

In some examples, the operating system provides a "desktop" user interface that is displayed upon turning on the mobile computing device 410, activating the mobile computing device 410 from a sleep state, upon "unlocking" the mobile computing device 410, or upon receiving user-selection of the "home" button 418c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 410 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 412 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 410 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 410 may include other application modules and hardware. A call handling unit may receive an indication of an incoming telephone call and provide a user capabilities to answer the incoming telephone call. A media player may allow a user to listen to music or play movies that are stored in local memory of the mobile computing device 410. The mobile telephone 410 may include a digital camera sensor, and corresponding image and video capture and editing software. An internet browser may enable the user to view content from a web page by typing in an addresses corresponding to the web page or selecting a link to the web page.

The mobile computing device 410 may include an antenna to wirelessly communicate information with the base station 440. The base station 440 may be one of many base stations in a collection of base stations (e.g., a mobile telephone cellular network) that enables the mobile computing device 410 to maintain communication with a network 450 as the mobile computing device is geographically moved. The computing device 410 may alternatively or additionally communicate with the network 450 through a Wi-Fi router or a wired connection (e.g., Ethernet, USB, or FIREWIRE). The computing device 410 may also wirelessly communicate with other computing devices using BLUETOOTH protocols, or may employ an ad-hoc wireless network.

A service provider that operates the network of base stations may connect the mobile computing device 410 to the network 450 to enable communication between the mobile computing device 410 and other computerized devices that provide services 460. Although the services 460 may be provided over different networks (e.g., the service provider's internal network, the Public Switched Telephone Network, and the Internet), network 450 is illustrated as a single network. The service provider may operate a server system 452 that routes information packets and voice data between the mobile computing device 410 and computing devices associated with the services 460.

The network 450 may connect the mobile computing device 410 to the Public Switched Telephone Network (PSTN) 462 in order to establish voice or fax communication between the mobile computing device 410 and another computing device. For example, the service provider server system 452 may receive an indication from the PSTN 462 of an incoming call for the mobile computing device 410. Conversely, the mobile computing device 410 may send a communication to the service provider server system 452 initiating a telephone call with a telephone number that is associated with a device accessible through the PSTN 462.

The network 450 may connect the mobile computing device 410 with a Voice over Internet Protocol (VoIP) service 464 that routes voice communications over an IP network, as opposed to the PSTN. For example, a user of the mobile computing device 410 may invoke a VoIP application and initiate a call using the program. The service provider server system 452 may forward voice data from the call to a VoIP service, which may route the call over the internet to a corresponding computing device, potentially using the PSTN for a final leg of the connection.

An application store 466 may provide a user of the mobile computing device 410 the ability to browse a list of remotely stored application programs that the user may download over the network 450 and install on the mobile computing device 410. The application store 466 may serve as a repository of applications developed by third-party application developers. An application program that is installed on the mobile computing device 410 may be able to communicate over the network 450 with server systems that are designated for the application program. For example, a VoIP application program may be downloaded from the Application Store 466, enabling the user to communicate with the VoIP service 464.

The mobile computing device 410 may access content on the internet 468 through network 450. For example, a user of the mobile computing device 410 may invoke a web browser application that requests data from remote computing devices that are accessible at designated universal resource locations. In various examples, some of the services 460 are accessible over the internet.

The mobile computing device may communicate with a personal computer 470. For example, the personal computer 470 may be the home computer for a user of the mobile computing device 410. Thus, the user may be able to stream media from his personal computer 470. The user may also view the file structure of his personal computer 470, and transmit selected documents between the computerized devices.

A voice recognition service 472 may receive voice communication data recorded with the mobile computing device's microphone 422, and translate the voice communication into corresponding textual data. In some examples, the translated text is provided to a search engine as a web query, and responsive search engine search results are transmitted to the mobile computing device 410.

The mobile computing device 410 may communicate with a social network 474. The social network may include numerous members, some of which have agreed to be related as acquaintances. Application programs on the mobile computing device 410 may access the social network 474 to retrieve information based on the acquaintances of the user of the mobile computing device. For example, an "address book" application program may retrieve telephone numbers for the user's acquaintances. In various examples, content may be delivered to the mobile computing device 410 based on social network distances from the user to other members. For example, advertisement and news article content may be selected for the user based on a level of interaction with such content by members that are "close" to the user (e.g., members that are "friends" or "friends of friends").

The mobile computing device 410 may access a personal set of contacts 476 through network 450. Each contact may identify an individual and include information about that individual (e.g., a phone number, an email address, and a birthday). Because the set of contacts is hosted remotely to the mobile computing device 410, the user may access and maintain the contacts 476 across several devices as a common set of contacts.

The mobile computing device 410 may access cloud-based application programs 478. Cloud-computing provides application programs (e.g., a word processor or an email program) that are hosted remotely from the mobile computing device 410, and may be accessed by the device 410 using a web browser or a dedicated program. Example cloud-based application programs include GOOGLE DOCS word processor and spreadsheet service, GOOGLE GMAIL webmail service, and PICASA picture manager.

Mapping service 480 can provide the mobile computing device 410 with street maps, route planning information, and satellite images. An example mapping service is GOOGLE MAPS. The mapping service 480 may also receive queries and return location-specific results. For example, the mobile computing device 410 may send an estimated location of the mobile computing device and a user-entered query for "pizza places" to the mapping service 480. The mapping service 480 may return a street map with "markers" superimposed on the map that identify geographical locations of nearby "pizza places."

Turn-by-turn service 482 may provide the mobile computing device 410 with turn-by-turn directions to a user-supplied destination. For example, the turn-by-turn service 482 may stream to device 410 a street-level view of an estimated location of the device, along with data for providing audio commands and superimposing arrows that direct a user of the device 410 to the destination.

Various forms of streaming media 484 may be requested by the mobile computing device 410. For example, computing device 410 may request a stream for a pre-recorded video file, a live television program, or a live radio program. Example services that provide streaming media include YOUTUBE and PANDORA.

A micro-blogging service 486 may receive from the mobile computing device 410 a user-input post that does not identify recipients of the post. The micro-blogging service 486 may disseminate the post to other members of the micro-blogging service 486 that agreed to subscribe to the user.

A search engine 488 may receive user-entered textual or verbal queries from the mobile computing device 410, determine a set of internet-accessible documents that are responsive to the query, and provide to the device 410 information to display a list of search results for the responsive documents. In examples where a verbal query is received, the voice recognition service 472 may translate the received audio into a textual query that is sent to the search engine.

These and other services may be implemented in a server system 490. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 5:
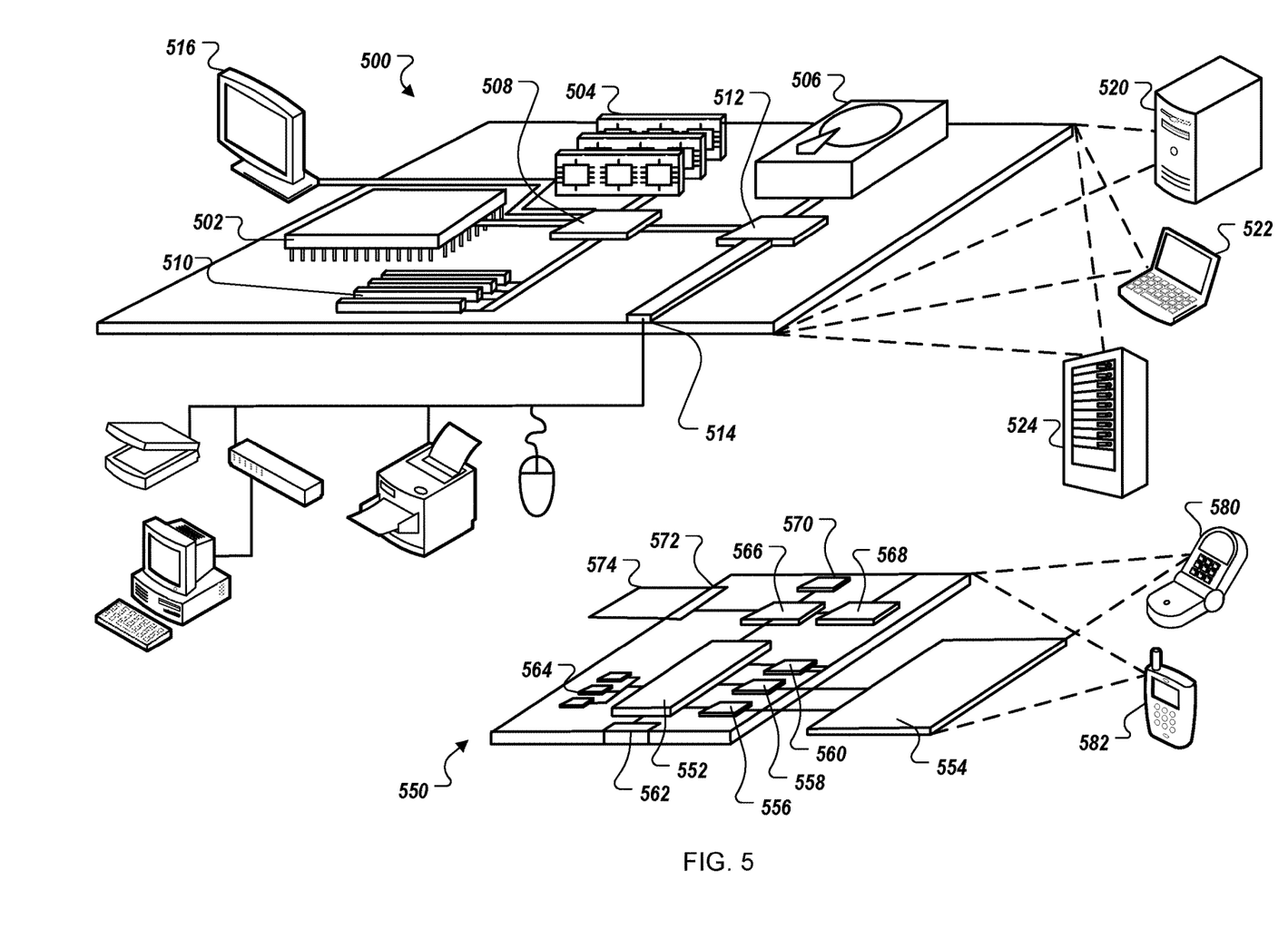
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
   obtaining a first image from a camera;
   determining that the first image does not satisfy an image requirement;
   in response to determining that the first image does not satisfy an image requirement, increasing an optical transmission of a lens of the camera;
   obtaining a second image with the camera while the optical transmission of the lens of the camera is increased;
   obtaining a second image requirement for a third image;
   determining a current optical transmission of the lens of the camera before obtaining the third image; and
   determining to increase the optical transmission of the lens of the camera before obtaining the third image based on both the second image requirement and the current optical transmission of the lens.

2. The method of claim 1, wherein increasing an optical transmission of the lens comprises:
   decreasing a tint of the lens.

3. The method of claim 2, wherein decreasing a tint of the lens comprises:
   applying a voltage to a coating on the lens, wherein the voltage causes the coating on the lens to lighten the tint.

4. The method of claim 1, wherein determining that the first image does not satisfy an image requirement comprises:
   obtaining the image requirement from an application; and
   determining that the image does not satisfy the image requirement obtained from the application.

5. The method of claim 4, wherein obtaining the image requirement from an application comprises:
   identifying the application; and
   selecting the image requirements that are associated with the application that was identified from among image requirements stored for multiple different applications.

6. The method of claim 4, wherein obtaining the image requirement from an application comprises:
   providing the first image to an application; and
   obtaining an indication from the application that a quality of the first image is insufficient.

7. The method of claim 1, comprising:
   obtaining an indication of an amount of ambient light from an ambient light sensor; and
   increasing the optical transmission of the lens of the camera based on the amount of ambient light before obtaining the first image.

8. The method of claim 1, comprising:
   after obtaining the second image, determining that the second image satisfies the image requirement; and
   in response to determining that the second image satisfies the image requirement, decreasing the optical transmission of the lens of the camera.

9. The method of claim 1, comprising:
   determining that a user is interacting with a particular application; and
   in response to determining that the user is interacting with the particular application, obtaining a particular image requirement for the particular application as the image requirement.

10. A system comprising:
    one or more processors and one or more storage devices storing instructions that are operable, when executed by the one or more processors, to cause the one or more processors to perform operations comprising:
    obtaining a first image from a camera;
    determining that the first image does not satisfy an image requirement;
    in response to determining that the first image does not satisfy an image requirement, increasing an optical transmission of a lens of the camera;
    obtaining a second image with the camera while the optical transmission of the lens of the camera is increased;
    obtaining a second image requirement for a third image;
    determining a current optical transmission of the lens of the camera before obtaining the third image; and
    determining to increase the optical transmission of the lens of the camera before obtaining the third image based on both the second image requirement and the current optical transmission of the lens.

11. The system of claim 10, wherein increasing an optical transmission of the lens includes decreasing a tint of the lens.

12. The system of claim 11, wherein decreasing a tint of the lens comprises:
applying a voltage to a coating on the lens, wherein the voltage causes the coating on the lens to lighten the tint.

13. The system of claim 10, wherein determining that the first image does not satisfy an image requirement comprises:
obtaining the image requirement from an application; and
determining that the image does not satisfy the image requirement obtained from the application.

14. The system of claim 13, wherein obtaining the image requirement from an application comprises:
identifying the application; and
selecting the image requirements that are associated with the application that was identified from among image requirements stored for multiple different applications.

15. The system of claim 13, wherein obtaining the image requirement from an application comprises:
providing the first image to an application; and
obtaining an indication from the application that a quality of the first image is insufficient.

16. The system of claim 10, the operations comprising:
obtaining an indication of an amount of ambient light from an ambient light sensor; and
increasing the optical transmission of the lens of the camera based on the amount of ambient light before obtaining the first image.

17. The system of claim 10, the operations comprising:
after obtaining the second image, determining that the second image satisfies the image requirement; and
in response to determining that the second image satisfies the image requirement, decreasing the optical transmission of the lens of the camera.

18. A non-transitory computer-readable medium storing instructions executable by one or more processors which, upon such execution, cause the one or more processors to perform operations comprising:
obtaining a first image from a camera;
determining that the first image does not satisfy an image requirement;
in response to determining that the first image does not satisfy an image requirement, increasing an optical transmission of a lens of the camera; and
obtaining a second image with the camera while the optical transmission of the lens of the camera is increased;
obtaining a second image requirement for a third image;
determining a current optical transmission of the lens of the camera before obtaining the third image; and
determining to increase the optical transmission of the lens of the camera before obtaining the third image based on both the second image requirement and the current optical transmission of the lens.

19. The medium of claim 18, wherein determining that the first image does not satisfy an image requirement comprises:
obtaining the image requirement from an application; and
determining that the image does not satisfy the image requirement obtained from the application.

20. The medium of claim 19, wherein obtaining the image requirement from an application comprises:
identifying the application; and
selecting the image requirements that are associated with the application that was identified from among image requirements stored for multiple different applications.

\* \* \* \* \*